(12) United States Patent
Confer et al.

(10) Patent No.: US 6,721,452 B2
(45) Date of Patent: Apr. 13, 2004

(54) SYSTEM AND METHOD OF HANDWRITTEN CHARACTER RECOGNITION

(75) Inventors: William J. Confer, Auburn, AL (US); Richard O. Chapman, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 10/242,104

(22) Filed: Sep. 12, 2002

(65) Prior Publication Data

US 2003/0048948 A1 Mar. 13, 2003

Related U.S. Application Data

(60) Provisional application No. 60/318,831, filed on Sep. 12, 2001.

(51) Int. Cl.$^7$ ................................................. G06K 9/48
(52) U.S. Cl. .......................... 382/197; 382/198; 382/202
(58) Field of Search ................................. 382/159, 173, 382/181, 185–190, 195, 197–198, 202, 209, 218, 276; 400/110

(56) References Cited

U.S. PATENT DOCUMENTS

| | | | | |
|---|---|---|---|---|
| 4,524,454 A | * | 6/1985 | Ejiri ............................ | 382/198 |
| 4,578,811 A | | 3/1986 | Inagaki ........................ | 382/182 |
| 4,628,532 A | | 12/1986 | Stone et al. ................. | 382/197 |
| 4,653,107 A | | 3/1987 | Shojima et al. ............. | 382/189 |
| 4,757,551 A | | 7/1988 | Kobayashi et al. .......... | 382/170 |
| 4,961,231 A | | 10/1990 | Nakayama et al. .......... | 382/197 |
| 5,333,209 A | | 7/1994 | Sinden et al. ................ | 382/187 |
| 5,481,625 A | | 1/1996 | Suzuki ......................... | 382/187 |
| 5,526,440 A | | 6/1996 | Sakano et al. ............... | 382/202 |
| 5,528,700 A | | 6/1996 | Takatori et al. .............. | 382/157 |
| 5,537,489 A | | 7/1996 | Sinden et al. ................ | 382/187 |
| 5,563,959 A | | 10/1996 | Gallo et al. .................. | 382/187 |
| 5,579,408 A | | 11/1996 | Sakaguchi et al. .......... | 382/187 |

(List continued on next page.)

OTHER PUBLICATIONS

Chan, Kam–Fai & Yeung, Dit–Yan; A Simple Yet Robust Structural Approach for Recognizing On–Line Handwritten Alphanumeric Characters; Clear Water Bay, Kowloon, Hong Kong.

Goldberg, David & Richardson, Cate; Touch–Typing With a Stylus; Interchi '93; Apr. 24–29, 1993; pp. 80–87; Xerox Corporation, Palo Alto, California.

(List continued on next page.)

*Primary Examiner*—Daniel Mariam
(74) *Attorney, Agent, or Firm*—Gardner Groff, P.C.

(57) ABSTRACT

An "activity"-based system and method for on-line character recognition that requires reduced amounts of memory for code or data, is alphabet-independent, and can be trained by entering the alphabet once. The alphabet-independent nature of the algorithm, as well as the ease with which recognition may be optimized dynamically, makes it particularly well suited for writing in noisy environments (e.g., mobile or on a subway) or by persons with impaired motor skills or nervous conditions.

12 Claims, 13 Drawing Sheets

A1 = 3.2, A2 = 1.6, A3 = 1.6, A4 = 1.0, A5 = 1.3, A6 = 1.3, A7 = 1.0

U.S. PATENT DOCUMENTS

| | | | |
|---|---|---|---|
| 5,586,198 A | * 12/1996 | Lakritz | 382/185 |
| 5,590,220 A | 12/1996 | Takahashi | 382/203 |
| 5,592,565 A | 1/1997 | Shojima et al. | 382/185 |
| 5,649,027 A | 7/1997 | Mahajan et al. | 382/185 |
| 5,673,337 A | 9/1997 | Gallo et al. | 382/187 |
| 5,680,478 A | 10/1997 | Wang et al. | 382/176 |
| 5,680,479 A | 10/1997 | Wang et al. | 382/176 |
| 5,684,891 A | 11/1997 | Tanaka et al. | 382/178 |
| 5,719,959 A | 2/1998 | Krtolica | |
| 5,732,154 A | 3/1998 | Dai | |
| 5,742,702 A | 4/1998 | Oki | |
| 5,742,705 A | 4/1998 | Parthasarathy | |
| 5,757,962 A | 5/1998 | Gallo et al. | |
| 5,784,504 A | 7/1998 | Anderson et al. | |
| 5,787,202 A | 7/1998 | Ueno | |
| 5,809,183 A | 9/1998 | Serizawa et al. | |
| 5,841,902 A | 11/1998 | Tu | |
| 5,845,020 A | 12/1998 | Nagaishi | |
| 5,881,172 A | 3/1999 | Pintsov | |
| 5,911,005 A | 6/1999 | Uchiyama | |
| 5,923,793 A | 7/1999 | Ikebata | |
| 5,926,564 A | 7/1999 | Kimura | |
| 5,940,532 A | 8/1999 | Tanaka | |
| 5,940,535 A | 8/1999 | Huang | |
| 5,943,438 A | 8/1999 | Zunkler | |
| 5,966,464 A | 10/1999 | Kojima | |
| 5,991,439 A | 11/1999 | Tanaka et al. | |
| 6,023,529 A | * 2/2000 | Ilan et al. | 382/186 |
| 6,081,616 A | 6/2000 | Vaezi et al. | |
| 6,101,270 A | 8/2000 | Takahashi | |
| 6,114,764 A | 9/2000 | Hoshino et al. | |
| 6,115,506 A | 9/2000 | Koshinaka | |
| 6,185,332 B1 | 2/2001 | Thompson et al. | |
| 6,208,756 B1 | 3/2001 | Suzuki | |
| 6,226,404 B1 | 5/2001 | Ikebata | |
| 6,240,209 B1 | 5/2001 | Wilcke | |
| 6,252,984 B1 | 6/2001 | Haneda et al. | |

OTHER PUBLICATIONS

Hellkvist, Stefan; On–line character recognition on small hand–held terminals using elastic matching; Stockholm 1999; pp. 3–40; Royal Institute of Technology.

Lin, Chang–Keng & Jeng, Bor–Shenn; On–Line Recognition of Handwritten Chinese Characters and Alphabets; 1990; pp. 2029–2032; Telecommunication Laboratories and National Central University, Taiwan, R.O.C.

Sibert, Dr. John; Issues Limiting the Acceptance of User Interfaces Using Gesture Input and Handwriting Character Recognition; 1987; pp. 155–158.

Suen, Ching Y., Berthod, Marc, & Mori, Shunji; Automatic Recognition of Handprinted Characters—The State of the Art; Proceedings of the IEEE; Apr. 1980; pp. 469–487; vol. 68, No. 4.

Zhao, Peng, Yasuda, Toshihiro, & Sato, Yukio; Cursive-writer: On–Line Cursive Writing Recognition System; 1993; pp. 703–706.

* cited by examiner

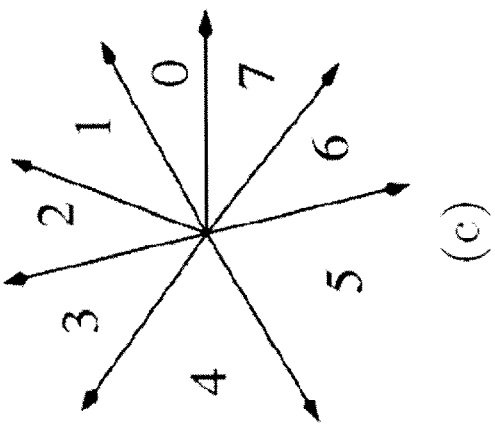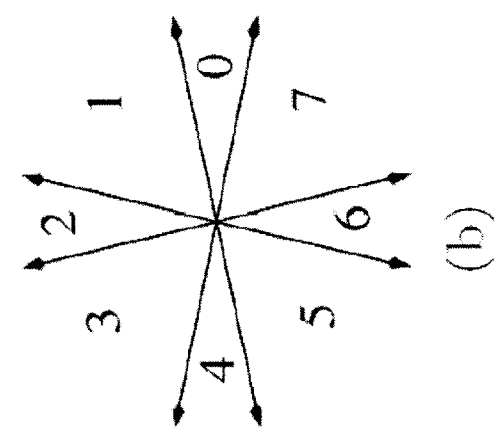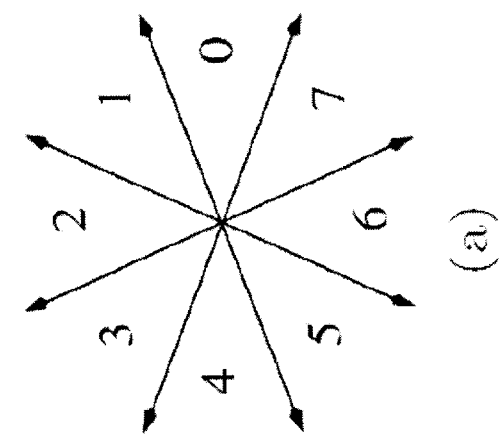
FIGURE 2

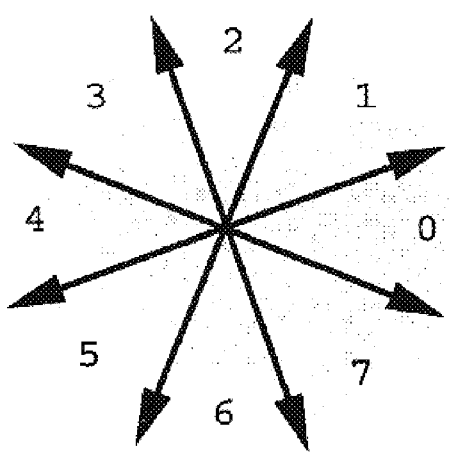 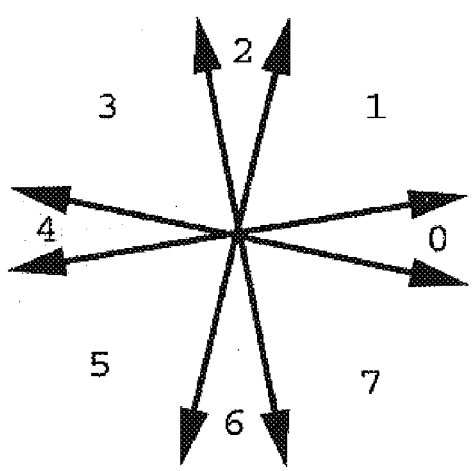
(a)            (b)
FIGURE 10

Fig. 12 – Example of Activity over the user Character 'W' a) Activity Regions b) Activity measure for each Activity Region

_US 6,721,452 B2_

SYSTEM AND METHOD OF HANDWRITTEN CHARACTER RECOGNITION

CROSS-REFERENCE TO RELATED APPLICATION

This application claims the benefit of U.S. Provisional Patent Application Serial No. 60/318,831, filed Sep. 12, 2001, which is hereby incorporated herein by reference in its entirety for all purposes.

FIELD OF THE INVENTION

The present invention relates generally to the field of pattern and character recognition; and more particularly to an "activity"-based system and method for feature extraction, representation and character recognition that reduces the required processing capacity for recognizing single stroke characters (or multiple strokes concatenated into one stroke) or patterns, with the intent that said characters or patterns may be created, removed, or edited from an alphabet by an individual for the purpose of personalization, without a method redesign. Further, the system and method of the present invention provide a parameter set such that its variance over an arbitrary alphabet can optimize recognition accuracy specific to that alphabet.

BACKGROUND OF THE INVENTION

Methods for character, handwriting and pattern recognition for the purpose of alphanumeric or symbolic data (collectively referred to herein as "text") entry into computer systems has been a key research area for electrical engineers and computer scientists since the earliest days of computers. In fact, handwriting-based input systems were designed and attempted as early as about 1959, prior to the widespread use of alphanumeric keyboards. Even these systems are based on the symbol recognition technologies of about the early 1950s. Most early methods were "off-line" processing methods, which used both temporal and string contextual information to increase recognition accuracy. "On-line" recognition uses only temporal drawing information to recognize while a user is writing. Generally, on-line methods sacrifice accuracy for real-time performance speeds. That sacrifice typically is not necessary for off-line recognition.

During the bulk of the 1960s, the keyboard was the premier form of text input as well as primary human interface to the computer. With the introduction of Douglas Engelbart's "mouse" and "graphical user interface" (GUI) in 1968, and the advent of digitizing tablets in the late 1960s, focus returned to research dealing with more natural human interfaces for manipulating digitized information. This remains the trend today with the various mainstream operating systems and desktop environments such as Apple's Macintosh OS, X-Windows for the various Unix systems, and Microsoft's Windows operating systems. In these systems, the mouse or some other pointing device such as a tablet or stylus are used to visually manipulate the organization of information on a screen (e.g., moving a window from the left side of the screen to the right, or to select a block of text). The text input mechanisms to all these systems, however, is still based primarily on the keyboard.

In the modern world, computing devices are getting smaller and more powerful (sometimes exceeding the power of five year old desktop personal computers) and are cheaper to produce. These small devices require text input devices that are not as cumbersome as keyboards. One potential alternative is handwriting recognition. Devices such as Apple's Newton provided this technology, but with unacceptable performance. This is due to the complex issues of not only character recognition, but of trying to separate individual characters and symbols from handwritten words, sentences or complete documents prior to recognizing each character. Only recently has a viable solution to character separation been proposed.

In about 1993, the concept of writing characters one on top of the other in single strokes so that each character is automatically separated by "pen events" (such as pressing the pen to the writing surface to signify the start of a new character, dragging the pen along the writing surface to represent the structure of the character, and lifting the pen from the writing surface to signify the end of a character) was introduced. This reduces recognition tasks to the character level. Personal digital assistants (PDAs) like the Palm Pilot and iPaq have become mainstream and are incorporating this character recognition concept with great success.

The recognition accuracy of these devices is compromised, however, in the attempt to provide a specialized alphabet that is accessible to all users, along with a recognition method robust enough to handle the different writing styles of an arbitrary user. Palm's Graffiti language, for example forces users to learn an alphabet that is potentially different from the day-to-day alphabet they are accustomed to. This adds user error to the recognition failure rates as they may continue to draw the letter 'Q' as they would on paper while trying to enter text into the Palm Pilot. This is an unnecessary constraint on the user, especially those who lack the motor control required to perform some of the Graffiti strokes. This would included sufferers of Parkinson's disease, Multiple Sclerosis (MS) and Muscular Dystrophy (MD). Additionally, the Palm recognition method does not appear to be robust enough to distinguish letters like 'U' and 'V' naturally, and so a serif was added onto the tail of the 'V' for greater separation. While this improves the distinction between such letters, it adds even greater difficulty to learning the new alphabet. In order to avoid these unnatural characters, one recognition system adds code that, when determining that the input character was either a 'P' or 'D', compares the height of the stem to the height of the attached curve in order to properly recognize. This does improve accuracy, but suggests that additional changes to the alphabet would require more character specific code to be written to handle new similarities, thus preventing the user from updating the character dictionary herself.

Some character recognition techniques such as structural matching and elastic relaxation employ complex feature manipulation methods for converting a "sloppy" character to one that is stored in a character dictionary. These methods are difficult to comprehend and deploy by most vendors (in practice) and have high computational requirements. While the Merlin system was designed to be interpreted (Java) on weak devices such as portable phones, its incorporation of these methods detract from its speed.

Presently, most research in on-line character recognition has centered around single character entry systems. Characters are entered one at a time and the recognizer classifies the character before the next is written. This provides the user immediate feedback so that errors can be corrected as they occur. Typically, there is a simple method for the user to depict the beginning and end of each character—commonly accomplished by pen down and up events.

Unistrokes, developed at Xerox Corporation in about 1993, is a well known example of a single character, pen-event system. Unistrokes characters were designed to be written one on top of another so as to minimize the real estate required for recognition and to allow for "eyes free operation". The Unistrokes alphabet is based on five basic strokes and their rotational deformations. While several characters ('i', 'j', 'L', 'o', 's', 'v' and 'z' for example) are represented by strokes similar to their Roman drawings, most characters' strokes require memorization. Additionally, a model has been developed for predicting the time required to enter arbitrary text with Unistrokes by an expert user. This is particularly useful since several variations of the Unistrokes alphabet have been introduced over the past nine years.

Since about the mid 1990's online character recognition has become widely employed in Personal Digital Assistants (PDA's), beginning with the Palm OS device, which primarily defined the product category. A popular variation of Unistrokes is the Graffiti system used in the Palm OS family of PDA's. Graffiti improved upon Unistrokes by representing characters with symbols that are, for the most part, quite like their Roman counterparts. A disadvantage of both Graffiti and Unistrokes is that their alphabets are static. As users change applications, more or fewer characters may be required. For example, there is little need for a simple, arithmetic calculator to recognize characters other than digits, some punctuation, and operators. Reducing the size of the alphabet in these situations might also increase recognition accuracy. Graffiti has several characters that are composed of multiple strokes in order to allow a more natural writing style. A number of factors, however have limited the use of character recognition to this category of device, and has even, for some PDA users, proven too frustrating. Some factors that have limited wider acceptance of character recognition include:

Lower real-world accuracy rates than advertised

Fairly significant requirements for memory and processor speed

Perceived complexity to develop

Dependence on a stylized alphabet that users are forced to learn

T-Cube, developed at Apple Computers in about 1994, is a self-disclosing method for character input. Nine pie-shaped menus are shown on a screen (or tablet), each menu containing eight characters or character commands. Characters are input by "flicking" a stylus from the center of a pie to one of its eight characters. This approach significantly decreases the amount of stylus-to-pad time required to draw an arbitrary character since each drawing is a unidirectional flick. T-Cube also uses a variety of earcons to aid users in their writing. There are two basic problems that prevent T-Cube from being an acceptable form of character input in mobile or wearable devices. First, because of the visual aspect of the pies, eyes-free operation is impossible. Second, circular shaped menus have been shown to be difficult to scan with the eye for many users, reducing the speed at which they can be correctly accessed.

Two other notable self-disclosing systems that incorporate circular forms are Quikwriting and Cirrin. These two systems are quite similar. Each maps the characters of the alphabet about the perimeter of a circular or rectangular form. Characters are drawn by sliding a stylus from the center of the form to a character. By sliding rather than flicking, users can write entire words with one long stroke, sliding from character to character. These two systems suffer the same problems as T-Cube.

In about 2000, the Minimal Device Independent Text Input Method (MDITIM) was developed. MDITIM represented drawings of characters with a chain of the four cardinal directions. This coarse grain resolution allows for a wide variety of input devices other than a stylus and pad (e.g., touchpads, mice, joysticks and keyboards). As with Quikwriting and Cirrin, MDITIM allows users to draw entire words with a single, long stroke. The disadvantage of MDITIM is that the drawings representing characters are not intuitive and require a bit of memorization.

Some of the most robust recognizers in development today are based on elastic, structural matching. While recognition accuracy for these algorithms is very high (averaging 97–98%), their recognition speed can be slow. For example, a known algorithm is capable of recognizing only up to about 2.8 characters per second on an Intel 486 50 MHz processor. Another algorithm is reported to perform at rates up to about 3.03 characters per second on an Intel StrongArm processor (approximately 133 MHz). Other algorithms have an average speed of 7.5 characters per second running on a Sun SPARC 10 Unix workstation.

Thus, it can be seen that needs exist for improved systems and methods for character recognition. It is to the provision of improved systems and methods for character recognition meeting these and other needs that the present invention is primarily directed.

SUMMARY OF THE INVENTION

Example embodiments of the present invention provide an algorithm that, by means of an improved feature extraction technique, significantly reduces the computational overhead required to support robust, online character recognition, and permits the use of arbitrary alphabets. The algorithm can be made adaptive, so that it transparently modifies the parameters of the recognition algorithm to increase accuracy with a particular alphabet as used by a single user, over time. The system and method of the present invention is adaptable to a variety of applications and many types of devices. First, devices with very little computational capability can now incorporate character recognition, for example, a 20 MHz, 8-bit microcontroller using 40 K bytes of memory. Thus, toys, pagers, mobile phones, and many other small, inexpensive devices can take advantage of character recognition for command and data entry. Second, the alphabet independence of the algorithm makes it attractive for use by those who require application specific alphabets. Any set of marks can be assigned arbitrary meanings since the algorithm does not require the use of particular features of the Roman alphabet or any other. The algorithm can be made adaptive, so that the idiosyncrasies of the writing of any particular user can be incorporated and thus increase the accuracy of the recognition. Finally, this algorithm, in practice, appears to exhibit an immunity to noise that makes it forgiving of the writing style of someone writing in a noisy environment (such as on a subway, for example), or suffering from a tremor, nervous or motor condition.

Preferred forms of the invention provide a system and method for on-line character recognition that is fast, portable, and consumes very little memory for code or data. The algorithm is alphabet-independent, and does not require training beyond entering the alphabet once. The algorithm uses an "activity" value in performing feature extraction, to achieve a high rate of accuracy. The recognition is improved dynamically without further input from the user, and brings character recognition capability to classes of devices that heretofore have not possessed that capability due to limited computing resources, including toys, two-way pagers, and other small devices. An example embodiment of the invention achieves a recognition rate of 16.8 characters per second on a 20 MHz, 8-bit microcontroller without floating-point. The alphabet-independent nature of the algorithm, as well as the ease with which recognition may be optimized dynamically, makes it particularly well suited for enhancing the capability of persons with impaired motor skills to communicate by writing.

In one aspect, the invention is a method for character recognition, the method preferably comprising receiving input data representing an input character; extracting at least one feature from the said input data, the at least one feature including an activity metric; comparing the feature(s) extracted from the input data to an alphabet comprising a plurality of output characters; and selecting an output character based on the comparison of feature(s).

In another aspect, the invention is a method of recognizing an input character representation, the method preferably comprising collecting data corresponding to at least a portion of a character stroke; mapping the collected data to at least one directional code; and approximating the number of directional codes occurring in the character stroke portion.

In yet another aspect, the invention is computer executable software for implementing either of the above-described methods; computer readable media comprising said software; and/or a computer programmed to execute that software.

In yet another aspect, the invention is a system for recognizing an input character representation. The system preferably includes an input device for receiving and collecting data corresponding to at least a portion of an input character stroke; and a processor for mapping the collected data to at least one directional code, and approximating the number of directional codes occurring in the character stroke portion. In a further preferred embodiment, the system optionally further comprises memory for storing an alphabet of characters for comparison to collected data corresponding to at least a portion of an input character stroke.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWING FIGURES

FIG. 2 shows three directional code mappings suitable for use in connection with example embodiments of the present invention.

FIG. 3 shows directional code representations of the letters "D", "P", "W", "V" and "A" according to example embodiments of the present invention.

FIG. 10 shows two example directional mappings for use in connection with the method and device of the present invention.

DETAILED DESCRIPTION

Figure 1:
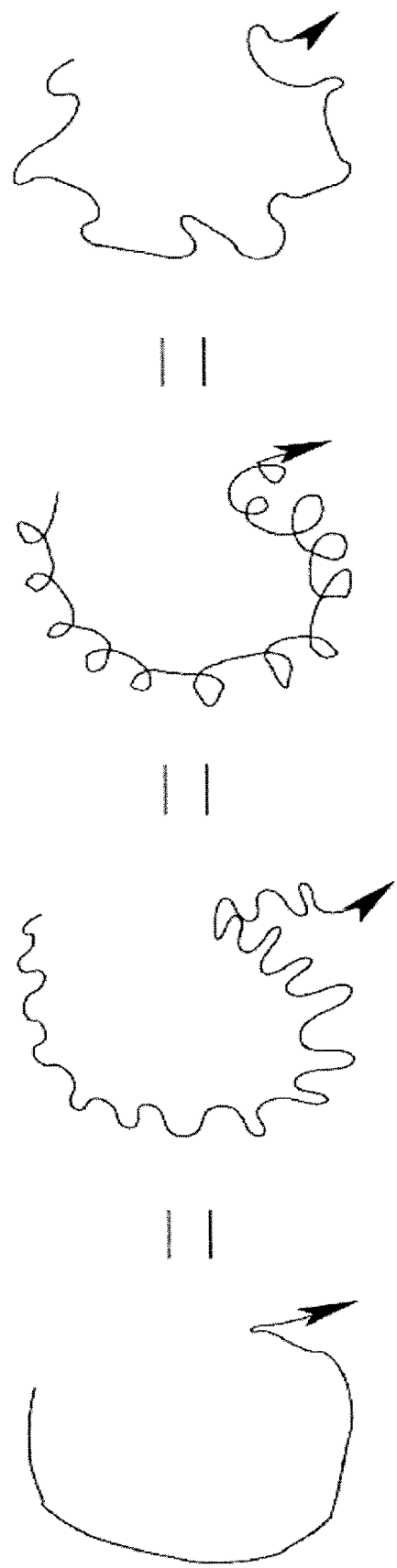
FIG. 1 shows several examples of a handwritten character capable of recognition as the letter "G" according to an example embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

In example embodiments, the present invention is a computer-based system and method for recognition of single-stroke, handwritten characters or symbols. Unlike existing methods which are designed around a particular alphabet (e.g., Palm's Graffiti, Jot, or Unistrokes), this invention is designed to be robust enough to handle arbitrary characters and symbols so that each user can design their own alphabet or symbol library based on the way they already write with a pen or pencil. The method provides a parameter set such that recognition can be optimized based on each user's idiosyncrasies. All regular noise (i.e., wave or tremor oriented) is eliminated to the degree that what might appear as a large collection of scribbles (say from writing on a subway) is easily recognized based on temporal sequencing. Varying angles of writing are also handled quite well with a theoretical range of +/−180 degrees (dependent on the alphabet.) Letters which are graphically similar (e.g., 'D' and 'P') are handled without specific non-ambiguity code as found in most character recognition methods. Also, the storage and recognition of characters is designed such that both noise reduction and rotation are handled implicitly, affording much shorter code, and higher recognition speeds. This allows the method to be applied on relatively slow computing devices such as hand-held PDAs, and cheap microprocessors. The runtime recognition method is deterministic. This method can be used in conjunction with any pointing device (i.e., mouse, stylus, touch-pad, etc.)

The algorithm presented in this paper enables the use of a low-resolution mapping system that affords device independence. Example embodiments are implemented using both a stylus/pad combination and an inexpensive touchpad. In comparison to previously known systems, example embodiments of the system and algorithm of the present invention have produced an average recognition speed of 16.8 characters per second on a relatively resource limited implementation—namely a 20 MHz, 8 bit microcontroller.

Preprocessing

Typically, before recognition of characters is performed, a drawing of a character is preprocessed so that it can be described in the format native to the recognition algorithm. This generally affords greater recognition rates and allows instances of characters to be stored efficiently.

Resampling

When drawing a character, it is quite likely that the speed of the pen will vary over different portions of the stroke. For example, while drawing the capital letter 'V', the device capturing the pen movement will probably capture few, well separated coordinates along the left and right slopes, and many tightly packed coordinates around the base joint. This irregular distribution is typically due to the pen slowing down in anticipation of returning in an upward direction. Additionally, there is no guarantee that the same number of coordinates will be captured each time the same character is drawn.

To deal with these issues, the algorithm of the present invention preferably resamples the drawing of a character by linearly interpolating N+1 Cartesian coordinates into a vector $R=(r_1, r_2, \ldots, r_{N+1})$ over the length of the drawing, so that line segments between consecutive coordinates are of equal length and both the first and last coordinates are the same as those captured in the original drawing. As well as helping to insure that each R is of constant size, spatially resampling a drawing in this manner also aids in dampening regular noise and tremor and has been shown to benefit recognition. FIG. 1 shows four example drawings of the letter 'G' that are each correctly classified by an example algorithm according to the present invention. The leftmost drawing is very close to the character class for 'G' in the test alphabet. The next two examples in the figure were drawn with exaggerated regular noise. Proper classification of these types of drawings is in part due to the noise reduction that resampling provides. Some noise that is introduced into drawings of a character is not regular, say noise that occurs as the result of writing on a bus. Resampling cannot be relied on to eliminate this kind of noise. The rightmost drawing of the figure has several instances of this type of noise and is recognizable by the use of the feature extraction method described herein, which dampens the noise that spatial resampling typically cannot eliminate.

Directional Codes

While size and position of a drawing on the writing surface could be relevant in enhancing recognition, this algorithm of the present invention preferably emphasizes the direction of pen movement over the course of the stroke. This provides for eyes-free use, where a user is likely to draw the same character in many different locations on the writing surface, as well as in varied size. Each consecutive coordinate pair $(r_i, r_{i+1}) \in R$ is used to create a vector from the first element of the pair to the second. This vector is then mapped to one of a finite number of directional codes stored in a vector $D=<d_1, d_2, \ldots, d_N>$ where $d_i$=DirCodeMapping $(r_i, r_{i+1})$. Freeman's chain code (See Herbert Freeman, *Computer Processing of Line-Drawing Images*, ACM Computing Surveys, 6(1):57–97, March 1974, hereby incorporated herein by reference), which divides vector space into the eight cardinal directions E, NE, N, NW, W, SW, S, and SE (enumerated 0, ..., 7 respectively), as in FIG. 2(*a*), is frequently used for this. Since the present algorithm is intended to work with custom alphabets, a generalized direction mapping (based on Freeman's code) preferably is used, so that certain ranges of vector space can be emphasized over others with respect to a particular alphabet and user.

Additionally, these ranges can be optimized over an alphabet to further separate characters, thereby improving recognition. For example, if a particular user draws the vertical and horizontal portions of characters in an alphabet in a close to vertical and horizontal manner (with only rare deformations), the ranges for directions 0, 2, 4, and 6, in Freeman's mapping could be reduced as in FIG. 2(*b*). Further, if few characters in an alphabet require W, SW or S pen movements, the directional mapping could be altered to allow greater discrimination in the other directions, as in FIG. 2(*c*). Various methods may be utilized for automating the creation and optimization of directional code mappings, and comparing the recognition rates of these mappings to the traditional Freeman mapping.

Activity

While a vector of Freeman's chain codes could be used alone to describe a drawing of a character, generally no single vector element can be used to derive information about the overall drawing since deformations tend to be localized. The algorithm of the present invention addresses this issue by introducing a feature extraction metric that further compresses the information gained from directional codes and provides insight into the entire drawing in a general manner, as well as into important subregions. This metric is designated "activity" and may be defined over a vector D as follows:

$$\text{Activity}(D) = \frac{\text{Length}(D)}{\text{Dominance}(D)}$$

where Dominance(D) is the frequency of the dominant (most common) directional code. The activity metric is intended to approximate (quite loosely) the number of unique directional codes required to describe a given vector. If the directional code mapping used enumerates 8 unique values (as in Freeman's chain code), the value of activity over an arbitrary vector of these codes can range generally from 1.0 (only one directional code is present) to 8.0 (all possible codes appear in equal frequency). For example, the directional code vector <0,0,0,0,0,0,0,0,1,0,0,7> has an activity of 1.2. While there are clearly three distinct directional codes in the vector, the non-0 directions are both isolated and could likely be considered noise. The activity measured suggests that the drawing has a single dominant direction with few deformations, thereby significantly dampening noise that remained after spatial resampling. Stating the vector has three different directions, 0, 1 and 7, severely undermines the dominance of 0 and esthetically over-emphasizes the presence of 1 and 7.

In order to better understand the reasoning behind the activity metric, a brief discussion of the environment for which the algorithm of the present invention was developed will be provided. Originally, an algorithm for online character recognition was needed for use in small, low powered, wireless devices for note taking in an electronic classroom environment. The algorithm would preferably function with a variety of alphabets, and would preferably include the capability to switch between alphabets and to allow modifications or additions at any time. This would allow those individuals with shorthand skills to accelerate their note taking and additionally provide the capability for one to take notes using characters from a non-Roman alphabet such as Cyrillic.

Figure 3:
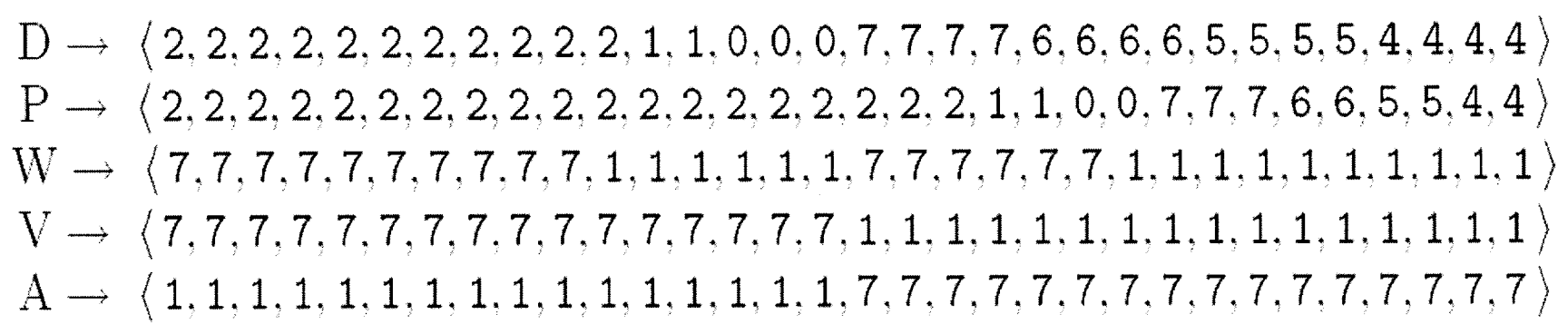

The runtime complexity of elastic matching was found to be too great for some potential target processors (such as a Zilog Z80), in part due to the multiple levels of deformation. Additionally, similar characters sometimes required the algorithm designer to develop code specifically to distinguish them. For example, the character 'D' could be described as a line in direction N (6) followed by a clockwise curve starting in direction E (0) and ending in direction W (4). Unfortunately, the same description could be used to describe the character 'P'. To resolve conflicts between the two characters, code would be added to calculate the ratio of the height of the curve to the height of the line. Were the ratio above some threshold, the 'P' is recognized, otherwise 'D' is recognized. This generally eliminates the possibility of modifying an alphabet after deployment. For example, consider the directional code vectors representing 'D' and 'P' as shown in FIG. 3. The activity measured over the 'D' is approximately 2.91, while the measure of 'P' is 1.6. The 'P' is primarily a line in a single direction with deformations (the curve at the end) totaling half the line's length, whereas the 'D' is mostly curve—thereby a higher activity. Additionally, notice that the curve in 'P' adding 0.6 to the straight line activity (1.0) is consistent with the relationship between the heights of the line and curve ratio. It is notable that the activity metric does not compare the heights of lines and curves; rather, it provides a separation measure, for most such problematic character combinations (e.g., 'u' and 'y'). No instance-specific code is required. FIG. 1 shows Directional Code representations of the letters 'D', 'P', 'W', 'V' and 'A'.

Activity Regions

Figure 4:
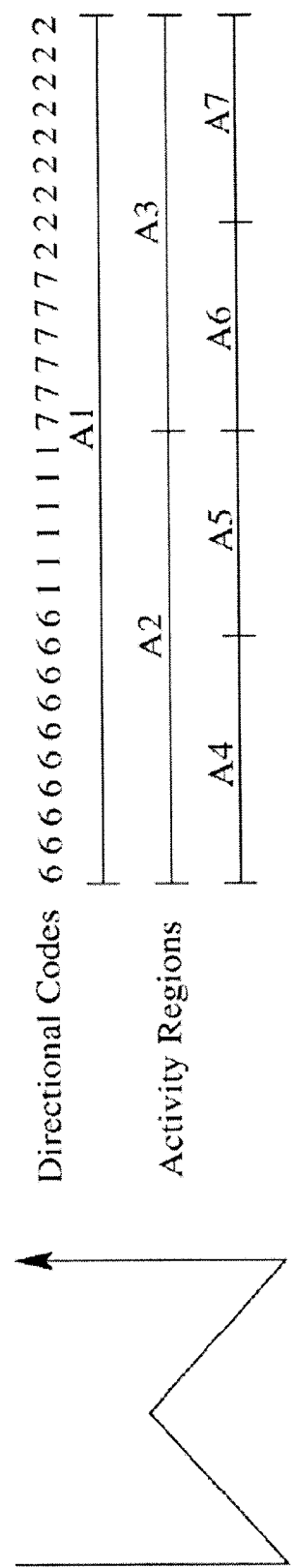
FIG. 4 shows activity regions and measures for the letter "W", according to an example embodiment of the present invention.

In order to further increase the usefulness of activity, it is preferable to measure the activity of portions of a drawing rather than only measuring over the entire length of the stroke. Activity regions define these directional subvectors. To this point, only the region spanning the length of the stroke has been considered. It has been found beneficial to character recognition to additionally measure activity over regions covering the first and second halves of the drawing, as well as each quarter of drawing. This totals seven activity regions, and is depicted in FIG. 4. While the number and location of regions used for a given implementation or alphabet may differ—or perhaps even evolve with usage, these seven regions have been chosen for usefulness with a variety of alphabets. For example, the activity measure over the full drawings for 'W' and 'V' in FIG. 3 are both 2.0, which does enable differentiation. Measuring activity on the first halves of each of these characters, 1.6 and 1.0 respectively, and further on the remaining regions more clearly separates the two. Additionally, since one region may cover a greater portion of the drawing than another, the activity measured over each region can optionally be weighted or biased by some selected scalar to emphasize the importance of a particular region in distinguishing characters of the alphabet.

Augmenting Activity with Directional Code Information

Regardless of the general success that is achieved using activity over multiple regions of a drawing, activity may fail to aid recognition under certain conditions. Take, for example, the seven activity regions on the characters 'A' and 'V' in FIG. 3—they are all identical. In fact, no region can be defined such that the activity for both characters is not equivalent. This means that activity alone cannot distinguish these two character drawings. The reason for this failure is that activity, while being a measure of direction, in no way reflects direction. A drawing with a full activity of 1.0 has only one direction code present after spatial resampling. What cannot be determined from activity is the actual direction of the stroke. To resolve this issue, elements of the directional codes are preferably maintained along with activity so that recognition between these classes of characters is possible.

Recognition

Prior to using the recognition algorithm, an alphabet to recognize must be provided. It is envisioned that users will either create alphabets from scratch or customize existing alphabets. To prepare a new (custom) alphabet, the user preferably draws each character of the desired alphabet at least once for the recognition system, helping to insure that the character classes in the alphabet contain the irregularities introduced by a given individual's writing style. This affords improved recognition for the user since the irregularities can be used to further separate characters rather than "test" the classifier in spite of them. Additionally, this method of alphabet generation allows the uses of non-Roman characters. This may be tremendously beneficial, not only to users who wish to include such characters, but to individuals with motor or nervous disorders as well. These individuals often perform the drawing of Roman characters with great irregularity. The described character representation in the alphabet already provides robust recognition capabilities for high noise environments, as can be seen in FIG. 1. Accounting for noise that is likely to exist in each drawing within the alphabet can only aid recognition.

Each character drawing to be included in the alphabet is preferably defined by an activity vector, a directional code vector and the character associated with the drawing. The inclusion of the directional code vector compensates for activity's lack of directional information. Care should be should taken when determining the length of each vector to ensure that both direction and activity have appropriate influence in the character classes. In example implementations described herein, drawings were preprocessed to a directional vector of length 32, and the resulting vector included as the directional code vector in the character. The activity vector used in complement is length 7 over the regions described above. To ensure that the activity vector has approximately the same total influence as the directional vector, a scalar bias of 1.222 was applied to each activity measure upon its calculation.

Once an alphabet is constructed, the recognition process is undertaken. A new drawing is introduced to the system and described as a directional code and activity vector pair (as above). This character is then compared against each member of the alphabet as a point in multi-dimensional hyperspace (39 dimensional space in the example implementations). A Euclidean-squared distance is used in example embodiments to measure the variance of a drawing and members of the alphabet. In alternate embodiments, other metrics may be equally useful. Classification over the calculated distances can be implemented with a K nearest-neighbor voting mechanism, or with other appropriate selection mechanisms. The set of K closest character classes is preferably found with respect to a given drawing, and the character with the most (either instance or weight-based) influence over the set is recognized.

Implementations and Results

Selected embodiments of the described algorithm have been implemented on three example platforms: Intel x86, Motorola Dragonball (Palm), and Rabbit Semiconductor 2000, which is a Z-80 compatible 20 MHz, 8-bit microcontroller with 128 K SRAM, 256 K flash, and onboard serial I/O. Various other systems, including without limitation a Parallax BASIC-Stamp and the like, also are readily adaptable for implementation of this algorithm in similar fashion.

Figure 5:
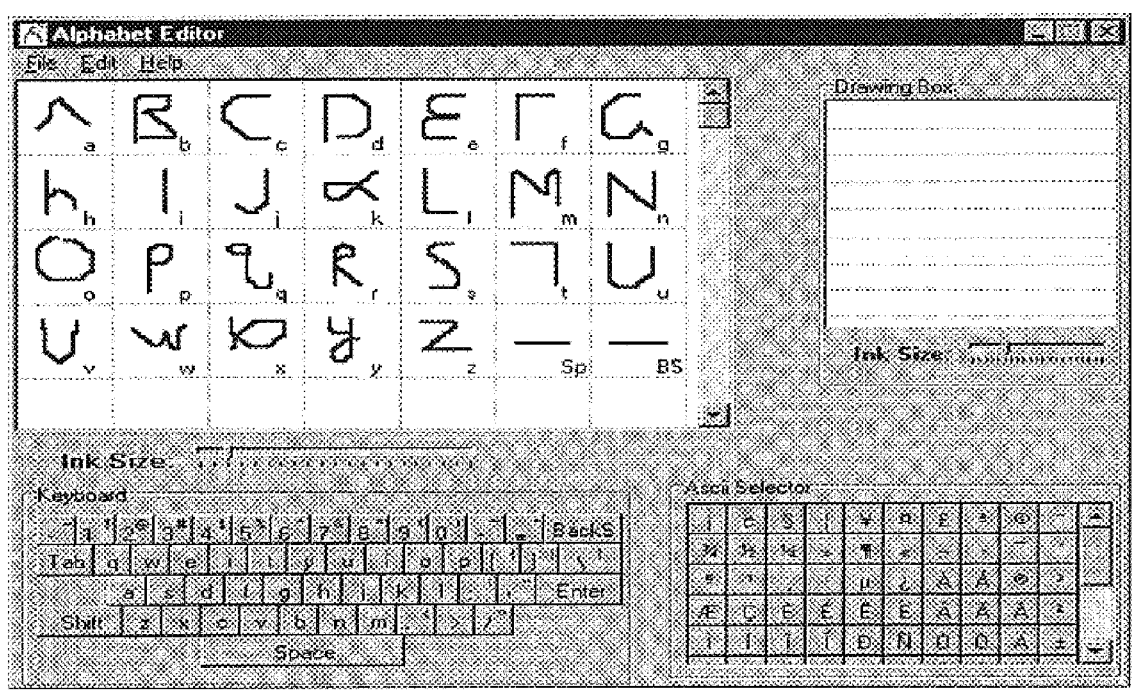
FIG. 5 shows a screen print of an example user interface of a windows-based alphabet editor according to an example embodiment of the present invention.

The example Intel implementation was done using Borland C++ Builder on Windows 98. It consisted of an alphabet creation/maintenance application and a notepad type application for testing recognition. The primary interface of the editor is shown according to an example embodiment in FIG. 5. Each character was described as a length 32 vector of directional codes and a length 7 activity vector. The direction mapping used was the Freeman mapping. To balance the influence of direction and activity, a scalar bias of 1.222 was applied to activity measure upon its calculation. This value was determined in the following manner: the maximum difference between two Freeman codes is 4, and between two Freeman activities the maximum difference is 7.0, thus the balanced Euclidean-squared influence equation is:

$$7(7.0 \times Bias)^2 = 32(4)^2$$

and $Bias \approx 1:222$. A comparison was done to measure the pairwise separation between characters in a test alphabet using:

1. Nearest-neighbor distance calculation in the 32-dimensional space of directional codes;
2. Same Euclidean distance calculation in 39-dimensional space of directional codes and activity; and
3. Euclidean-Squared distance calculation in 7-dimensional space of only activity.

The use of both Freeman directions and activity levels in calculation of nearest neighbor with activity level weighted by the above bias provided significantly better separation of similar characters (and hence better overall recognition) than the use of either directional codes or activity levels alone.

Figure 6:
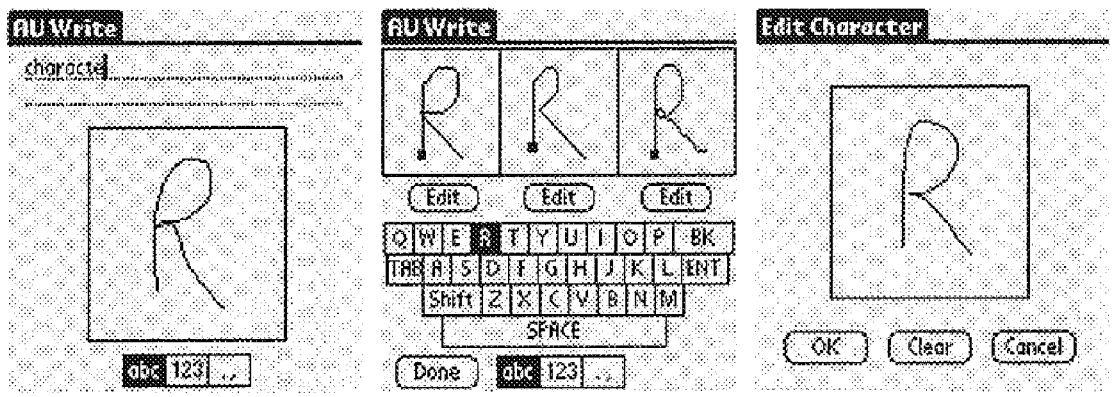
FIG. 6 shows a screen print of example recognition, alphabet and character editing screens for a Palm OS-based editor according to an example embodiment of the present invention.

The small size of the Windows code (only about 149 lines of C++, excluding the code for the user interface) and the small data structures required (less than about 30 K of data) indicated the ability to implement the algorithm on much smaller, slower processors. Given that handwriting recognition is now a common feature of PDA's, a fixed-point implementation was developed for Palm OS devices. The parameters used for this example implementation of the algorithm were identical to those in the Windows implementation other than the modifications required to scale for fixed point. The Palm implementation required about 35 K bytes for code and data, and about 6 K of persistent storage for an alphabet of 26 characters, space and backspace (all data is unpacked). The recognition screen and alphabet editor screens from the Palm application are depicted in FIG. 6. As the bulk of time spent in recognizing a character is typically in the calculation of distance between members of the alphabet, this implementation was also optimized by making two intermediate checks of the total distance. Since the variance range for an activity measure is twice that of a directional code, the activity vector is used to form the initial squared sum and a check was made after 12 and 24 dimensions of the direction vector. This allows for terminating the distance calculation if the partially calculated distance is already greater than the total distance to the closest character found so far. This resulted in a 22% speed increase at recognition time, based on internal clock measurements.

An 8-bit microcontroller implementation on a 20 MHz processor with very small onboard SRAM and flash memories proved the viability of the algorithm for adding character recognition capability to very inexpensive devices. The input device was a Fellowes Touch Mouse and the output device was a 2×20 line LCD display. Code size was about 1349 lines of Dynamic C (about 332 lines for recognition code). Including an alphabet comparable to that used in the Palm OS implementation, the binary image for this application is about 40 K bytes. No additional memories are required at runtime as no dynamic memory allocation is used. Thus, a processor with a 64 K address space is adequate. Measurements using the onboard timer on the Rabbit Semiconductor 2000 indicate a maximum character recognition speed on this very slow device of about 16.8 characters per second, significantly faster than humans are capable of drawing characters. The hardware is shown front and back in FIG. 7. It should be noted that most of the board pictured is an unused prototyping area—the only chips used are the microcontroller, an RS232 driver and an inverter. Due to the limited interface capabilities of this implementation, the alphabet editor written for the Windows environment was used to facilitate the creation of an alphabet. A Perl script was written to convert the files generated by the editor to the binary format required by the Rabbit. These files were then downloaded into flash memory using the Rabbit field utility.

Thus, it can be seen that the method of the present invention is suitable for implementation in a variety of devices, including relatively computationally weak devices. As a result, handwriting recognition capability can be added to any device possessing an 8-bit microcontroller with 64 K of program and data storage capability for the cost of the input device, which is likely to be only a few dollars in OEM quantities. The method permits the user to customize an alphabet to account for personal preferences or limitations in motor skills, without the need for post-deployment design. The recognition accuracy of the algorithm is comparable to or better than that of the algorithms currently shipping with Palm OS and Pocket PC devices.

Example Embodiments

The on-line character and symbol (collectively referred to herein as "Character") recognition method of the present invention will now be explained further with respect to the following embodiments, which are provided as examples only, and are not intended to be limiting. The user preferably provides a plurality of Inputs with the intent of building an Alphabet, whereupon the Alphabet is generated with a set of determined Parameters. Had an Alphabet been generated once before without change to these Parameters, it may rather be pulled from a storage. The user may then offer Inputs, one at a time, whereupon each Input is digitized from its Raw Vector to a representative Tuple with respect to the Parameters of the Alphabet. Said Tuple is then compared to each Tuple in the Alphabet. The Tuple in the Alphabet which is most sufficiently equivalent to said Tuple, considering Bias in the Alphabet, becomes the Output.

One or more external devices (collectively referred to herein as "Pointers") from which (X,Y) coordinate data may be collected and organized in a sequenced, temporal fashion are provided. Pointers provide a means for a user to "draw" a Character in some two-dimensional space. A storage (referred to herein as the "Alphabet") containing a plurality of Tuples representing Characters drawn by the user to provide a point of comparison, so that Inputs may be recognized by finding a sufficiently equivalent Tuple in the Alphabet. The Alphabet also contains Parameters. Parameters are global to all Tuples in Alphabet as well as to Inputs to be recognized against Alphabet.

A vector (referred to herein as "Activity Region Vector") of, for example, R elements storing the bounds of R Activity Regions in Mapped Vector is determined. A vector (referred to herein as "Activity Vector") of R Activities is determined. A scalar vector (referred to herein as "Bias") of K+R elements is determined. A vector (referred to herein as "Code Vector") of X elements is determined. A vector (referred to herein as "Distance Vector") of equal length to Raw Vector is determined. A vector (referred to herein as "Mapped Vector") with K elements is determined. A vector (referred to herein as "Raw Vector") of (X,Y) coordinate pairs is determined. A vector (referred to herein as "Substroke Vector") of, say K+1, (X,Y) coordinates is determined. An enumerable set of X directional codes (referred to herein as "Codes") is determined. A distance metric is determined a priori. A metric (referred to herein as "Activity") for evaluating some Activity Region is determined. A tuple representation (referred to herein as "Tuple") of a Character comprising a Mapped Vector and Activity Vector is determined. A tuple (referred to herein as "Parameters"), comprising K, a Directional Mapping, R, and a Bias is determined. Any change in Parameters initiates an update of each Tuple in Alphabet with respect to the corresponding Substroke Vector. Parameters may be varied upon creation of Alphabet so as to optimize recognition with respect to a given state of Alphabet.

A method for mapping (referred to herein as "Directional Mapping") a directional vector to Codes is also provided. A plurality of Characters are drawn with Pointers (referred to herein as "Input"), which the user wishes to have recognized. A plurality of substrings (referred to herein as "Activity Regions") of Mapped Vector are defined. Each Activity Region preferably comprises at least one element. A means (referred to herein as "Output") of returning a recognized Tuple in Alphabet as a Character to the user is preferably provided.

The means for determining Activity over some Activity Region in Mapped Vector is preferably as follows: a Code Vector of X elements is determined over Activity Region where element x of Code Vector is the number of instances of Code x in said Activity Region. The element of Code Vector of greatest value is D. The length of said Activity Region in Mapped Vector is N. Activity, then, for said Activity Region in Mapped Vector is N/D.

The above-described composition is preferably such that for each element in Raw Vector, a corresponding distance measure may be acquired and stored in Distance Vector. The first element of Distance Vector is preferably always 0. Each element of Distance Vector after the first is the distance (as prescribed by the above metric) between the corresponding element in Raw Vector and the previous element in Raw Vector added to the previous element of Distance Vector. By this, each element of Distance Vector represents the distance (as prescribed by the above metric) into the user's Character with respect to each corresponding element of Raw Vector. The last element of Distance Vector is the total length of the Character with respect to the above distance measure.

The composition of the Substroke Vector, where the coordinates of Substroke Vector are interpolated/extrapolated from Raw Strokes and Distance Vector, is preferably carried out such that the distance (as prescribed by the distance metric) between each element of Substroke Vector (save the first element) and the previous element of Substroke Vector are equivalent. The first element of Substroke Vector is equivalent to the first element of Raw Vector. The last element of Substroke Vector is equivalent to the last element of Raw Vector. The Mapped Vector is composed of K elements, where each element k of Mapped vector is the Directional Mapping of the vector from element k of Substroke Vector to element k+1 of Substroke Vector. The Activity Vector is composed of R Activities, where each element r of Activity Vector is the Activity measure of the Mapped Vector substring whose bounds are stored in element r of Activity Region Vector. The composition of Bias of K+R elements, where the first K elements of Bias correspond to the K elements of Mapped Vector and the last R elements of Bias correspond to the R elements of Activity Vector. Bias is used to accentuate those elements of Tuple's vector that are of distinguishable importance to Alphabet.

The composition of Raw Vector is defined by the user drawn Character generated by manipulating Pointers, having the character represented for the method as Raw Vector, whose (X,Y) coordinates are temporally sequenced such that the first element of the Raw Vector represents the initial point of the character, and the last element of the Raw Vector represents the terminating point of the character. Raw Vector is a single, pseudo-stroke representation of the user's character, which may consist of one or more actual drawn strokes (e.g., the character 'T' is typically drawn with two strokes while 'O' is typically drawn with only one).

The system of the present invention follows the basic premise that an Alphabet is generated and stored based on Parameters, and a user then draws Inputs which are recognized by the process and returned as Outputs. What is key is that Parameters may be chosen a priori, empirically, heuristically (so as to optimize recognition on Alphabet), and that Alphabet could be designed and generated by an individual for deployment to multiple users, or by an individual user for there own personal use.

Figure 8:
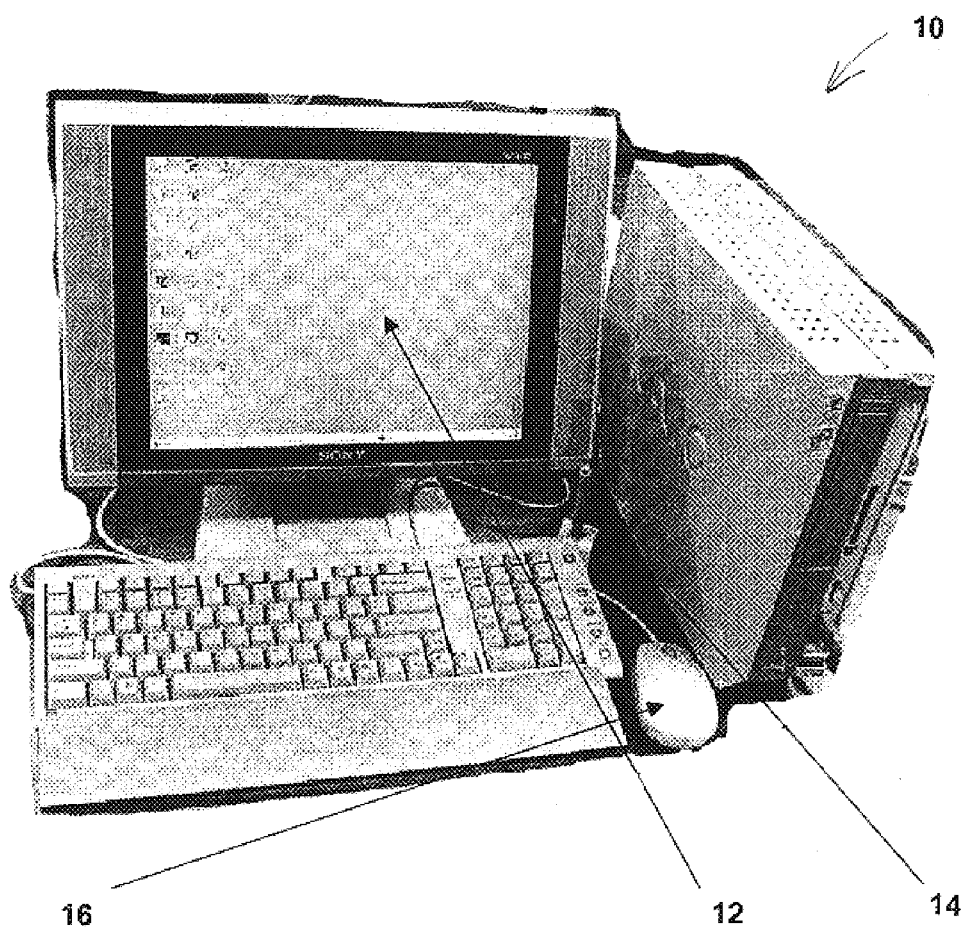
FIG. 8 shows a character recognition system according to an example embodiment of the present invention.
Figure 9:
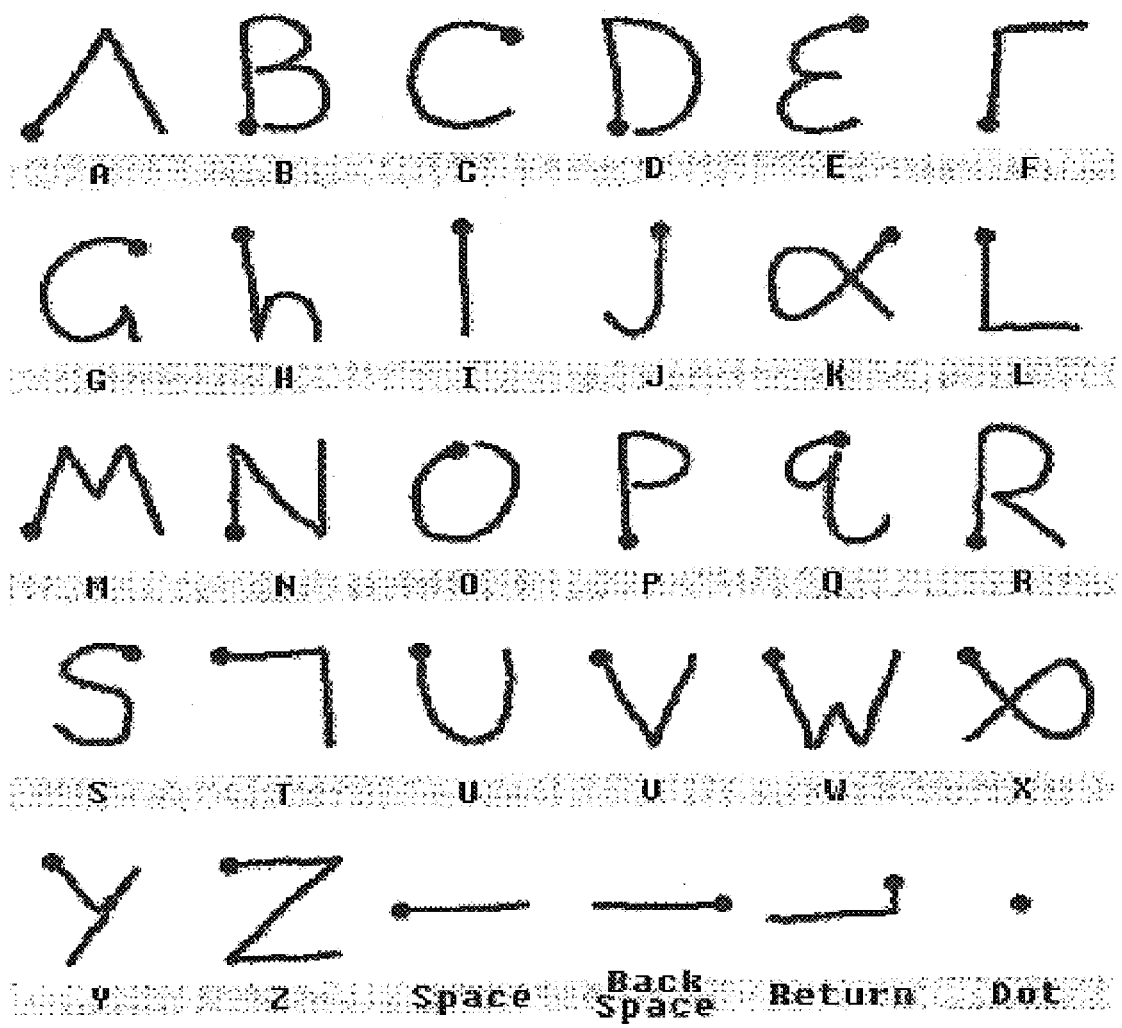
FIG. 9 shows an example alphabet for use in connection with the method and device of the present invention.
Figure 11:
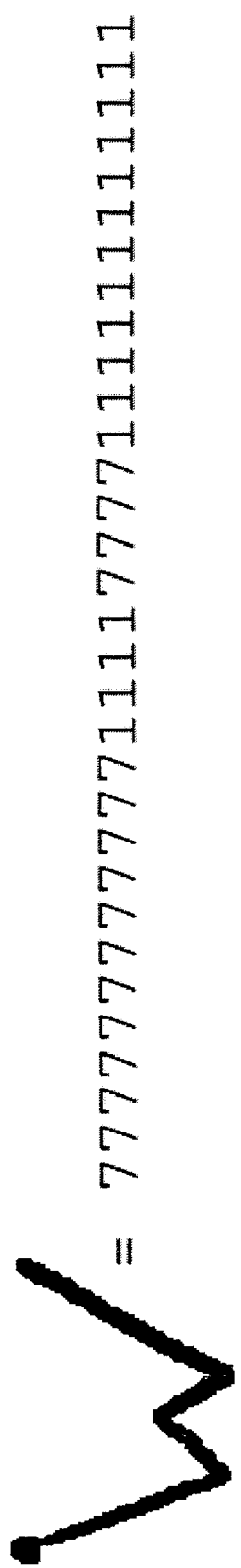
FIG. 11 shows an example mapped vector for the character "W" according to another embodiment of the present invention.
Figure 12:
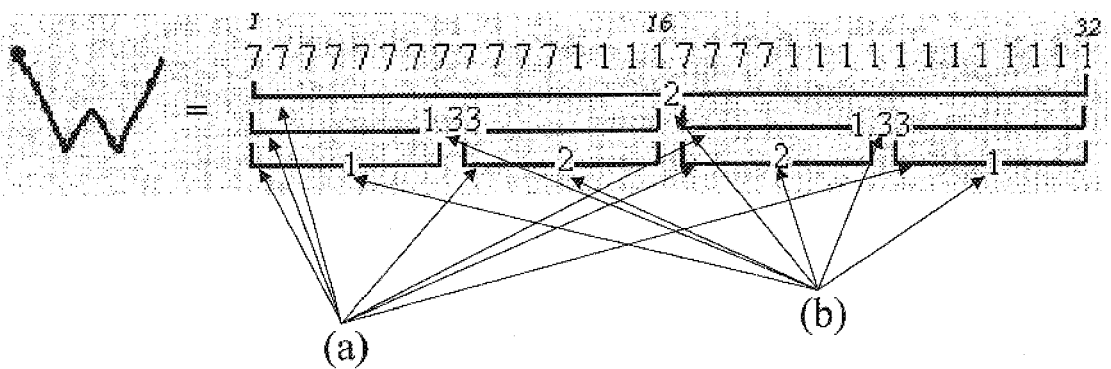
FIG. 12 is an example division of activity regions and determination of the activity metric for each activity region, according to an example embodiment of the present invention.
Figure 13:
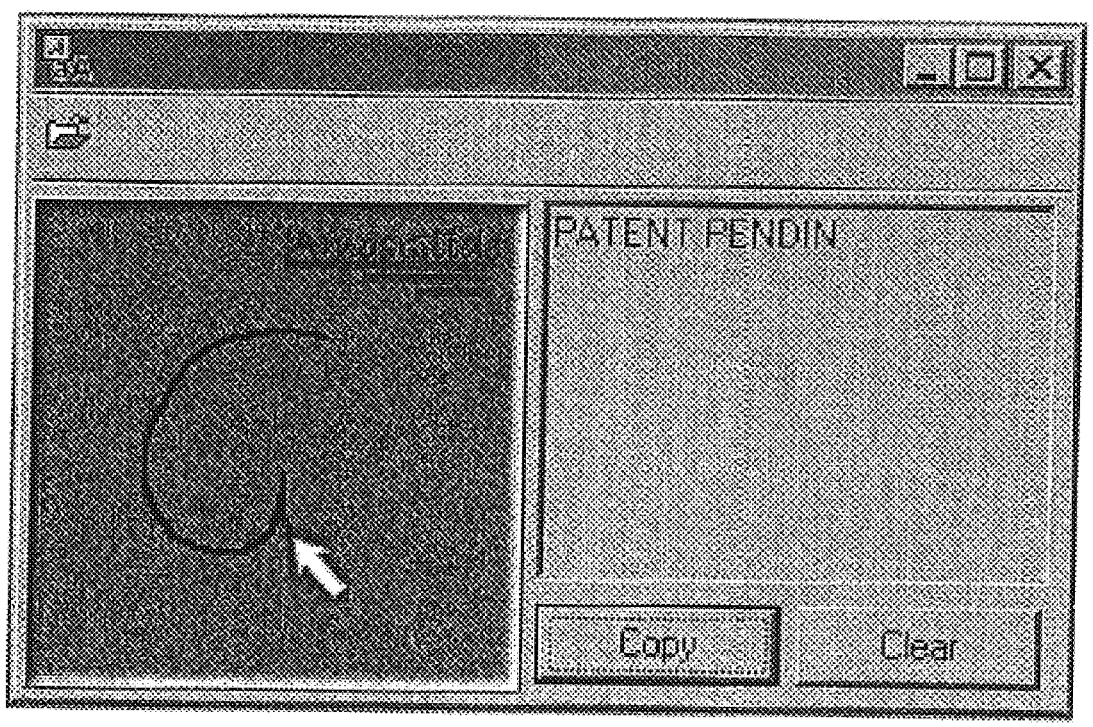
FIG. 13 is a screen print from a system according to an example embodiment of the present invention.

An example embodiment of the system of the present invention is shown in FIG. 8, for implementation on a desktop computer 10. Pointers were a radio sensitive tablet 12 with stylus 14 and a mouse 16 which could be used interchangeably. A user drew 29 Characters including each of the 26 capital letters, a symbol for the "Space" Character, a symbol for the "Backspace" Character, a symbol for the "Carriage Return" Character, and a dot symbol for the "Period" Character to create an alphabet as shown in FIG. 9. Since the user was familiar with Palm Graffiti, the alphabet generated was very similar to graffiti with only several changes (e.g., 'B', 'D', 'F', 'G', 'Q', 'V', and 'Y'). A Distance Metric (Euclidean distance) was chosen. A Directional Mapping to eight Codes was chosen (FIG. 10a). The length of the Substroke Vector was 33. Consequently, the length of Mapped Vector (FIG. 11) was 32. The length of Activity Region Vector (FIG. 12a) and Activity Vector (FIG. 12b) were 7. The Bias vector contained the scalar "1" for the first 32 elements and the scalar "1.25" for the last 7. Alphabet was then generated as described above and stored in a file local to the desktop computer. Sufficient equivalence of Tuples was performed using "Single Nearest Neighbor" in a 39 dimensional Euclidean hyper-space. A desktop application was written where the user could provide Inputs, and Outputs were provided on the screen (FIG. 13).

In an alternate embodiment of a system for implementation on a desktop computer 10, pointers were a radio sensitive tablet 12 with stylus 14 and a mouse 16 (FIG. 8) which could be used interchangeably. A user drew 29 Characters including each of the 26 capital letters, a symbol for the "Space" Character, a symbol for the "Backspace" Character, a symbol for the "Carriage Return" Character, and a dot symbol for the "Period" Character to create an alphabet (FIG. 9). Since the user was familiar with Palm Graffiti, the alphabet generated was very similar to graffiti with only several changes (e.g., 'B', 'D', 'F', 'G', 'Q', 'V', and 'Y'). A Distance Metric (Euclidean distance) was chosen. A Directional Mapping to eight Codes was chosen (FIG. 10b). The length of the Substroke Vector was 33. Consequently, the length of Mapped Vector (FIG. 11) was 32. The length of Activity Region Vector (FIG. 12a) and Activity Vector were 7. The Bias vector contained the scalar "1" for the first 32 elements and the scalar "1.727" for the last 7. Alphabet was then generated as described above and stored in a file local to the desktop computer. Sufficient equivalence of Tuples was performed using "Single Nearest Neighbor" in a 39 dimensional Euclidean hyper-space. A desktop application was written where the user could provide Inputs, and Outputs were provided on the screen (FIG. 13).

Figure 7:
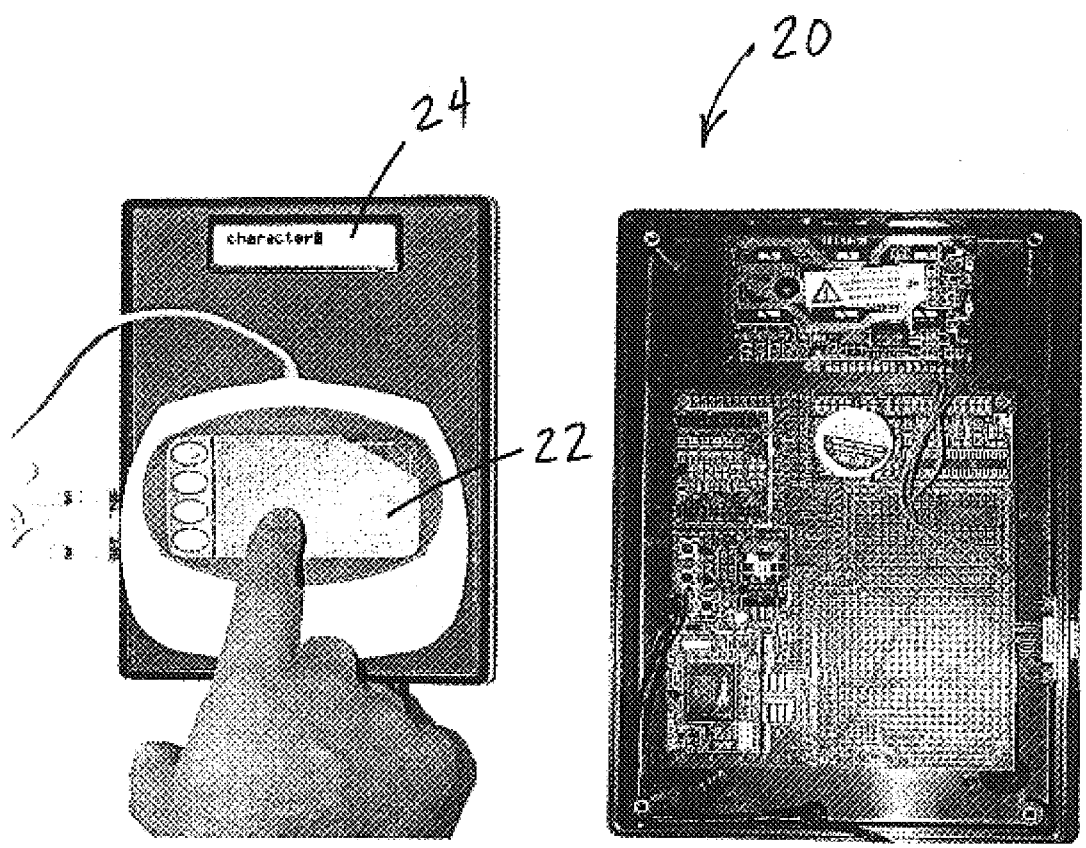
FIG. 7 shows front and back views of an 8-bit microcontroller-based system according to an example embodiment of the present invention.

Another embodiment of the system of the present invention is implemented on an 8-bit microprocessor 20 (such as the Rabbit Semiconductor 2000, a Zilog Z-80 processor system, A Parallax BASIC-stamp system, etc.), with a Pointer constructed of a touch-sensitive finger-pad 22 (FIG. 7). A user drew 29 Characters including each of the 26 capital letters, a symbol for the "Space" Character, a symbol for the "Backspace" Character, a symbol for the "Carriage Return" Character, and a dot symbol for the "Period" Character to create an alphabet (FIG. 9). Since the user was familiar with Palm Graffiti, the alphabet generated was very similar to graffiti with only several changes (e.g., 'B', 'D', 'F', 'G', 'Q', 'V', and 'Y'). A Distance Metric (Euclidean-squared distance) was chosen. A Directional Mapping to eight Codes was chosen (FIG. 10b). The length of the Substroke Vector was 33. Consequently, the length of Mapped Vector (FIG. 11) was 32. The length of Activity Region Vector (FIG. 12a) and Activity Vector were 7. The Bias vector contained the scalar "1" for the first 32 elements and the scalar "1.727" for the last 7. Alphabet was then generated as described above and stored in a memory on the Rabbit Semiconductor 2000. Sufficient equivalence of Tuples was performed using "Single Nearest Neighbor" in a 39 dimensional Euclidean-squared hyper-space. The touch-sensitive finger-pad 22 was used to provide Inputs, and Outputs were stored in memory on the Rabbit Semiconductor 2000 and displayed on a small LCD 24.

Another embodiment of the system of the present invention is geared toward individuals with a motor disability of some variety (e.g., Parkinson's disease, MS or MD). The system is substantially similar to one of the above-described embodiments, with the exception that the user provides an Alphabet that is visually non-similar to a known alphabet (e.g., Roman, Cyrilic).

Still another embodiment of the system of the present invention is geared toward individuals in active environments (e.g., subways, helicopter, etc.). The system is substantially similar to one of the above-described embodiments, with the exception that an Alphabet is provided that is visually non-similar to a known alphabet (e.g., Roman, Cyrilic) so that Inputs are more reliably recognized.

Another embodiment of the system of the present invention is substantially similar to one of the above-described embodiments, with the exception that the user provides an Alphabet distinct to her needs, a heuristic (e.g., a genetic algorithm) alters Parameters and regenerates Alphabet accordingly with the intent to separate Characters in Alphabet in order to optimize recognition on Alphabet.

A more efficient data structure may be developed for storing the alphabet, using the activity level for the whole stroke to organize the characters into a search tree. This may improve the recognition time yet further, as it replaces a linear search with a potentially logarithmic one. Additionally, heuristics may be developed to optimize the number of activity regions and directional codes, the placement and lengths of the activity regions, the scalar bias of the activity levels versus the directional codes in the distance calculation, and the angles defining the boundaries between adjacent directional codes. Dynamic modification of all the above parameters may be implemented using the "backspace" character as in indication of incorrect recognition. And alternate distance metrics may be employed, in addition to or instead of those discussed herein.

While the invention has been described with reference to preferred and example embodiments, it will be understood by those skilled in the art that a number of modifications, additions and deletions are within the scope of the invention, as defined by the following claims.

What is claimed is:

1. A method for character recognition, comprising:

converting input data representing an input character into a plurality of directional codes, each directional code indicating a direction associated with a portion of the input character, said plurality of directional codes representing at least one directional code vector;

calculating at least one activity indicator from the directional code vector, the activity indicator indicating the density of the dominant directional code of the directional code vector; and determining which one of a plurality of characters of an alphabet the input character corresponds to based on at least the activity indicator, wherein the step of determining which one of a plurality of characters of an alphabet the input character corresponds to further comprises using direction information associated with at least one of said plurality of directional codes in conjunction with activity indicator to make the determination.

2. The method of claim 1, further comprising receiving the input data prior to converting the input data into directional codes, wherein the received input data is collected by electronically sampling at least one input character stroke that has been drawn on a digitizer pad to represent said input character.

3. The method of claim 2, further comprising converting the sampled input data into coordinate data, the coordinate data comprising a respective coordinate pair for respective points along said at least one input character stroke.

4. The method of claim 1, wherein the step of converting the input data into a plurality of directional codes comprises mapping the input data to directional codes selected from a set of directional codes.

5. The method of claim 1, further comprising applying a weighting bias to at least one of said activity indicator and said direction information.

6. The method of claim 1, wherein the step of calculating at least one activity indicator comprises the density of the dominant directional code of the directional code vector comprising the input character.

7. The method of claim 1, further comprising dividing an input character stroke comprising the input character into one or more activity regions, and wherein the calculating step further comprises calculating an activity indicator associated with each activity region, and wherein the determining step comprises using all activity indicators to make the determination.

8. The method of claim 7, wherein each activity region has direction information, associated with it, the direction information associated with each activity region being associated with respective portions of said directional code vector, and wherein the determining step comprises using the activity indicators in conjunction with the direction information to determine which one of a plurality of characters of an alphabet of input characters the input character corresponds.

9. The method of claim 1, wherein the determining step comprises applying a nearest-neighbor voting algorithm that uses said at least one activity indicator.

10. The method of claim 1, further comprising inputting the alphabet as a user-defined set of characters.

11. A system for recognizing an input character representation, said system comprising:

an input device for receiving and collecting data corresponding to at least a portion of an input character stroke;

first logic configured to map the collected data to at least one directional code, and to approximate the number of directional codes occurring in the character stroke portion, said at least one directional code comprising a directional code vector;

second logic configured to calculate an activity indicator based on said at least one directional code, the activity indicator indicating a degree of dominance of one of the directional codes of the directional code vector; and third logic configured to determine which one of a plurality of characters of an alphabet the input character corresponds to based on at least the activity indicator, wherein the third logic uses direction information associated with said at least one directional code in conjunction with the activity indicator to make the determination.

12. The system of claim 11, further comprising memory for storing an alphabet of characters for use by the third logic in making the determination.

* * * * *